(12) United States Patent
Clifford et al.

(10) Patent No.: US 12,646,155 B2
(45) Date of Patent: Jun. 2, 2026

(54) POST-PROCESSING PANORAMIC IMAGERY GEO-RECTIFICATION SYSTEM

(71) Applicant: Aerial Sphere, LLC, Phoenix, AZ (US)

(72) Inventors: Ben Clifford, Maricopa, AZ (US); Yasser Taima, Dallas, TX (US); Trupti Khatavkar, Diamondhead, MS (US); John Femiani, Oxford, OH (US)

(73) Assignee: Aerial Sphere, LLC, Phoenix, AZ (US)

( * ) Notice: Subject to any disclaimer, the term of this patent is extended or adjusted under 35 U.S.C. 154(b) by 337 days.

(21) Appl. No.: 18/453,736

(22) Filed: Aug. 22, 2023

(65) Prior Publication Data

US 2024/0062348 A1 Feb. 22, 2024

Related U.S. Application Data

(60) Provisional application No. 63/399,973, filed on Aug. 22, 2022.

(51) Int. Cl.
*G06T 5/80* (2024.01)
*G06T 3/14* (2024.01)

(52) U.S. Cl.
CPC . *G06T 5/80* (2024.01); *G06T 3/14* (2024.01)

(58) Field of Classification Search
CPC .................................. G06T 3/14; G06T 5/80
See application file for complete search history.

(56) References Cited

U.S. PATENT DOCUMENTS

| | | | | |
|---|---|---|---|---|
| 9,219,858 | B2 * | 12/2015 | Fan ...................... | H04N 23/698 |
| 10,515,458 | B1 * | 12/2019 | Yakimenko ............... | G06T 7/33 |
| 11,468,654 | B2 * | 10/2022 | Gallagher .............. | G01C 17/34 |
| 12,310,274 | B1 * | 5/2025 | Muehlfeld ............ | G06T 3/4038 |
| 2009/0027417 | A1 * | 1/2009 | Horsfall .................. | G06T 17/05 |
| | | | | 345/629 |
| 2010/0283853 | A1 * | 11/2010 | Acree .................... | G01C 11/00 |
| | | | | 382/293 |
| 2013/0027554 | A1 * | 1/2013 | Meadow .................. | G06T 7/33 |
| | | | | 348/E7.085 |
| 2013/0077891 | A1 * | 3/2013 | Nimnual .................. | G06T 7/37 |
| | | | | 382/276 |
| 2014/0064554 | A1 * | 3/2014 | Coulter .................. | G06T 7/254 |
| | | | | 382/294 |

* cited by examiner

*Primary Examiner* — Stephen R Koziol
(74) *Attorney, Agent, or Firm* — Schmeiser, Olsen & Watts LLP

(57) ABSTRACT

A system for performing a post-processing panoramic imagery geo-rectification process is provided. The system is for use with aerial imagery and is agnostic to where the system operates, which may be a computing device including, without limitation, a PC, servers, or in the cloud. This process includes at least two subprocesses, wherein subprocess 1 includes instructions to solve six degrees of freedom for camera position, without human intervention; namely the latitude, longitude, altitude, pan, tilt, and roll. Subprocess 2 includes a method for placing warp points, which define a thin-plate spline that can be utilized on a server or within a compatible software system.

5 Claims, 1 Drawing Sheet

POST-PROCESSING PANORAMIC IMAGERY GEO-RECTIFICATION

POST-PROCESSING PANORAMIC IMAGERY GEO-RECTIFICATION
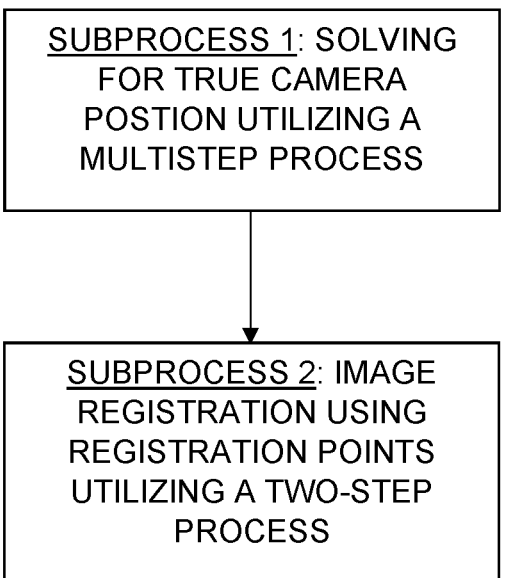

POST-PROCESSING PANORAMIC IMAGERY GEO-RECTIFICATION SYSTEM

CROSS REFERENCE TO RELATED APPLICATION[S]

This application claims priority to U.S. Provisional Patent Application entitled "POST-PROCESSING PANORAMIC IMAGERY GEO-RECTIFICATION SYSTEM," Ser. No. 63/399,973, filed Aug. 22, 2022, the disclosures of which are hereby incorporated entirely herein by reference.

BACKGROUND OF THE INVENTION

Technical Field

This invention relates generally to an image processing system and more particularly to a post-processing panoramic imagery geo-rectification system for aerial imagery.

State of the Art

Aerial photography is useful for many different purposes. For example, aerial photography is used for cartography, land-use planning, archaeology, movie production, environmental studies, surveillance, commercial advertising, conveyancing, artistic projects, and many other purposes. Various businesses and entities are utilizing aerial imagery in order to market and provide better service to customers and the like by using GIS maps and the like. However, the metadata associated with the imagery captured by the cameras typically have errors that require post-processing systems to solve or correct. Correction of the camera position for the imagery, along with the addition of warp-defining metadata, often involves manual or human interaction. The imagery that is captured is often compared to a geographic information system ("GIS") to provide additional information. Existing systems lack automation in the post-processing of the imagery.

Accordingly, there is a need for a post-processing panoramic imagery geo-rectification system for use with aerial spherical imagery.

DISCLOSURE OF THE INVENTION

The present invention relates to a post-processing panoramic imagery geo-rectification system for aerial spherical imagery. The system processes panoramic images using at least two subprocesses, wherein one subprocess is a multi-step process to determine or solve errors in the metadata associated with captured images, such as, but not limited to, solving six degrees of freedom for camera position, without human intervention, wherein the six degrees of freedom are latitude, longitude, altitude, pan, tilt, and roll. The system then may implement a second subprocess that is a two-step process to perform image registration in order to eliminate other distortions, such as elevation offsets and stitching errors.

An embodiment of a post-processing panoramic imagery geo-rectification system for use with aerial imagery includes a server having a processor and a memory and a software application providing instruction to the server to perform the geo-rectification. The system may include a computer having a processor and a memory coupled to the server, wherein a user can access the server through the computer in order to process the imagery.

The foregoing and other features and advantages of the present invention will be apparent from the following, more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 1 is a flow chart depicting a post-processing panoramic imagery geo-rectification in accordance with an embodiment.

DETAILED DESCRIPTION OF EMBODIMENTS OF THE INVENTION

As discussed above, embodiments of the present invention relate to a post-processing panoramic imagery geo-rectification system for aerial imagery. The system processes panoramic imagery and its metadata using at least two subprocesses, as shown in FIG. 1, wherein subprocess 1 is a multi-step process to solve six degrees of freedom for camera position, without human intervention, the six degrees of freedom including latitude, longitude, altitude, pan, tilt, and roll. The system then may implement subprocess 2, which is a two-step process to perform image registration in order to eliminate other distortions, such as elevation offsets and stitching errors.

Subprocess 1: Solving for True Camera Position

Step 1a: Solving for Tilt and Roll Using Horizon Detection

A machine-learning model is trained to recognize the horizon in a panoramic, equirectangular image. The model is insensitive to pan offsets. The model is used to predict offset values for tilt and roll that visually "level off" the horizon, similar to what a reasonable operator of a 3D viewer would recommend. Generally, the model is accurate within about 0.1 degree more than 90% of the time.

Step 1b: Approximating a Rough Solution for Pan Using the Sun's Azimuth

A machine-learning model is trained to detect the sun's azimuth in a panoramic, equirectangular image. The model is insensitive to the sun's height in the sky. A software application takes in the time of day and longitude of image capture, predicts the azimuth of where the sun should be in the image, compares that to the output of the trained model, and uses the sun offset to predict a pan offset. The model is accurate within about 2.0 degrees at least 90% of the time.

Step 1c: Refining Pan Solution Using Fast Fourier Transform (FFT)

1.c.1) A snapshot image is produced from imagery, pointing directly under the point of image capture (nadir or lowest point). This will be referred to as subprocess 1 snapshot 1.

1.c.2) Another snapshot of similar size and zoom-level is obtained from a ground-truth map provider. This will be referred to as subprocess 1 snapshot 2.

1.c.3) Subprocess 1 snapshots 1 and 2 are rotated against each other in increment, 1 degree at a time, not exceeding the 60-degree region of rotation surrounding the pan offset predicted by step 1b. The pixels of each increment are run through a fast Fourier transform (FFT) to determine the similarity of the snapshots. Each 1-degree increment is rated, and the best is chosen.

1.c.4) Step 1.c.3 is then repeated for a 2-degree region of rotation surrounding the new pan offset estimate, except the rotation is incremented by 0.1 degree, rather than 1 degree. The best similarity between the 2 snapshots, as produced by the same FFT algorithm, becomes the final pan offset prediction.

Step 1d: Solving for Latitude, Longitude, and Altitude Using Perspective-n-Point (PnP) Pose Computation Algorithm (solvePNP)

Camera pose offsets are predicted, using an open-source implementation of the Perspective-n-Point (PnP) pose computation algorithm (solvePNP). The tilt, roll, and pan offsets obtained in the previous steps are fed into the solvePNP algorithm, as doing so provides an answer more often, and also provides a better answer on average. The predictions for tilt, roll, and pan produced by solvePNP are discarded and the latitude, longitude, and altitude offset predictions are used.

Subprocess 2: Image Registration, Using Registration Points

The next 2 steps produce warp points. Warp points, as used herein, define a thin-plate-spline (TPS) server-side, so that when imagery is accessed by a viewer, the viewer provides accurate registration to ground truth.

Step 2a: Digital Elevation Module (DEM)

A grid of points is defined, approximately 1 mile square, positioned directly under the point of image capture (nadir). For each of those points, elevations are obtained from a ground-truth map provider, producing a grid of elevation points. The elevation points are stored, in memory, to produce parallax offsets for each warp point created by the next step. Once a sphere is fully processed, calculations are used to convert the elevation points into warp points, which are then uploaded to the server.

Step 2b: Using Machine Learning to Place Registration Points

A machine-learning model is trained, using the RAFT algorithm, to recognize and match common outdoor objects in a pair of standard orthographic-projection map images.

During inference, a snapshot image is produced from each set of imagery, pointing directly under the point of image capture (nadir). This will be referred to as subprocess 2 snapshot 1. Another snapshot of similar size and zoom-level is obtained from a ground-truth map provider. This will be referred to as subprocess 2 snapshot 2. Publicly sourced latitude/longitude points of street addresses are used to define regions of interest in subprocess 2 snapshot 1. For each region of interest, the model is used to visually seek for some real-world object that is similar between the snapshots. This produces a registration point for that region of interest, which is then uploaded to the server.

Once the spherical imagery is geo-rectified, it may be utilized by others to access the various geo-references and view particular areas with a greater amount of information.

It should be appreciated that in addition to geo-rectification of the spherical aerial imagery, the system is also able to determine proper elevation calculations. Thus, if there is a house on a mountain or hill, if the system selects an identifiable portion of the house or near surrounding area as a GCP in both the reference imagery and spherical aerial image, the system not only determines the latitude and longitude in spherical aerial image but determines a proper elevation for that latitude and longitude as well. This happens because of the thin plate spline warp that the system creates for its spherical aerial imagery.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A post-processing panoramic imagery geo-rectification system comprising:
   a server comprising a processor and a memory; and
   a computer coupled to the server wherein a user interfaces with the server through the computer, wherein the server is programmed to:
   process panoramic images using at least a first subprocess and a second subprocess, wherein the first subprocess determines and/or solves errors in metadata associated with captured images by:
   solving for tilt and roll offsets using a machine-learning model trained to recognize a horizon in a panoramic, equirectangular image, wherein the model is insensitive to pan offsets and predicts offset values for tilt and roll that visually level off the horizon;
   solving for pan offset using a machine-learning model trained to detect a sun's azimuth in the panoramic, equirectangular image, wherein the model is insensitive to the sun's height in the sky; and
   refining the pan offset solution using fast Fourier transform (FFT) by producing a first snapshot image from the spherical panoramic imagery pointing directly under a point of image capture, obtaining a second snapshot of similar size and zoom-level from a ground-truth map provider, and rotating the first and second snapshots against each other in increments while running pixels of each increment through the FFT to determine similarity of the snapshots; and
   wherein the second subprocess performs image registration to eliminate distortions.

2. The system of claim 1, wherein the first subprocess further solves six degrees of freedom for camera position.

3. The system of claim 1, wherein the first subprocess further solves for longitude, latitude and altitude offsets using the tilt, roll and pan offsets.

4. The system of claim 1, wherein the second subprocess defines a grid of points positioned under the captured images and obtains elevations producing a grid of elevation points.

5. The system of claim 1, wherein the distortions comprise elevation offsets and/or stitching errors.

* * * * *